No. 646,764. Patented Apr. 3, 1900.
T. STEELE.
ARTIFICIAL TOOTH.
(Application filed July 25, 1899.)
(No Model.)

WITNESSES:
John A Bergstrom
INVENTOR
Thomas Steele
BY Munn & Co
ATTORNEYS.

UNITED STATES PATENT OFFICE.

THOMAS STEELE, OF RED BANK, NEW JERSEY.

ARTIFICIAL TOOTH.

SPECIFICATION forming part of Letters Patent No. 646,764, dated April 3, 1900.

Application filed July 25, 1899. Serial No. 725,079. (No model.)

*To all whom it may concern:*

Be it known that I, THOMAS STEELE, of Red Bank, in the county of Monmouth and State of New Jersey, have invented a new and useful Improvement in Artificial Teeth, of which the following is a full, clear, and exact description.

One object of the invention is to provide a means whereby an attaching or connecting plate for a backing may be conveniently and securely applied to an artificial tooth, the application of the plate being such that said plate will be so anchored in a tooth that said tooth when forming a portion of bridgework or other dental structures will be positively held against vertical or lateral movement.

Another object of the invention is to provide a construction of connecting-plate for an artificial tooth that may be practically an integral portion of the tooth and which will not leave the tooth unless it be at the occurrence of a serious fracture of the tooth.

The invention consists in the novel construction and combination of the several parts, as will be hereinafter fully set forth, and pointed out in the claims.

Reference is to be had to the accompanying drawings, forming a part of this specification, in which similar characters of reference indicate corresponding parts in all the figures.

Figure 1:
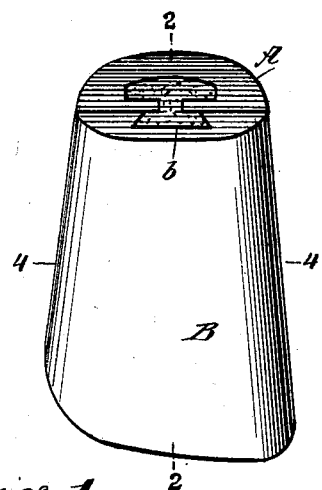
Figure 2:
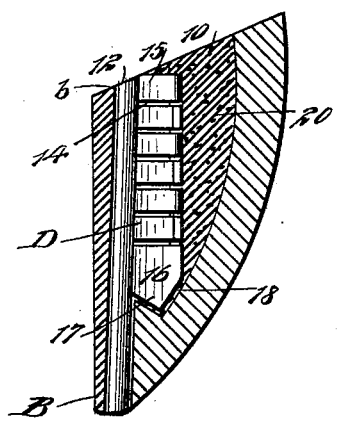
Figure 3:
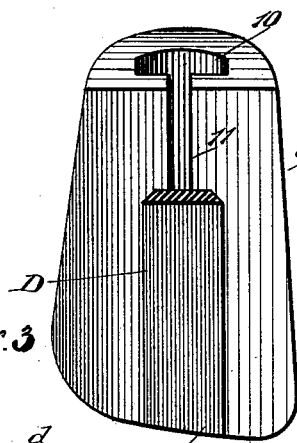
Figure 5:
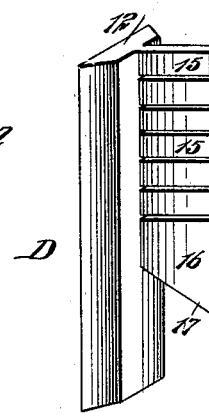
Figure 6:
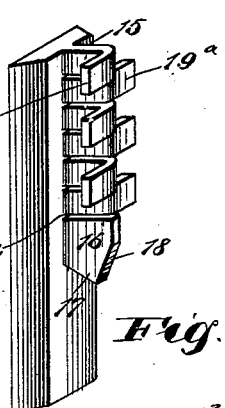
Figure 7:
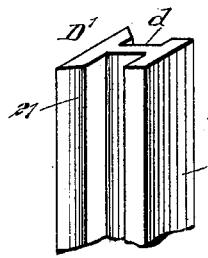
Figure 4:
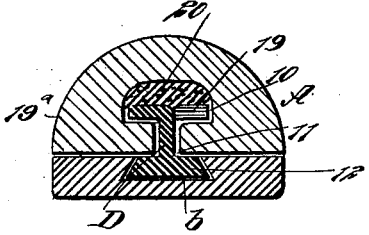
Figure 8:
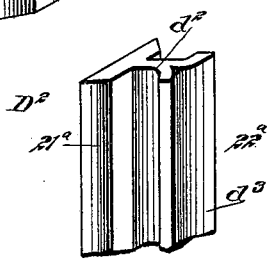

Figure 1 is a perspective view of a tooth and its backing, viewed from the rear, the tooth having the improvement applied. Fig. 2 is a longitudinal section through the tooth and backing, taken practically on the line 2 2 of Fig. 1. Fig. 3 is a rear elevation of the tooth, showing the application thereto of the improved device for attaching the tooth to the backing, the said device being in horizontal section. Fig. 4 is a horizontal section taken practically on the line 4 4 of Fig. 1. Fig. 5 is a perspective view of the improved inlay or fastening device, representing the device before it is completed. Fig. 6 is a view similar to Fig. 5, illustrating the improved inlay or fastening device in its completed state; and Figs. 7 and 8 are perspective views of modifications of the inlays.

A represents a porcelain or artificial tooth the back whereof is made plain and straight. The said tooth A is provided with a vertical chamber 10, extending from the top to a point at or near the bottom, and in the back of the tooth A a vertical slot 11 is produced, that is in communication with the said chamber, as shown in Figs. 1, 3, and 4, the slot 11 extending from the upper edge of the tooth to a point at or near the bottom.

The tooth A is adapted to receive a backing B, and the said backing is provided with a longitudinal dovetail slot $b$ upon its front face, or the face that is opposed to the rear face of the tooth A.

In connection with the tooth I employ a connecting-plate or inlay D. This plate is usually made of metal, any desired metallic substance being employed. The plate consists of a body portion 12, the sides whereof are inclined. In fact, the body 12 of the connecting-plate is dovetail in cross-section, being adapted to enter the dovetail slot in the backing B. In the construction of the connecting-plate D a longitudinal member 13 is formed, the said member being at a right angle to the central portion of the body, and the said member 13 extends, ordinarily, from a point near the bottom of the body member to the top thereof. The rear member 13 of the body 12 of said connecting-plate D has a series of horizontal slots 14 produced therein, forming a series of individual members or arms 15, the upper and lower surfaces of the members 15 being practically straight, with the exception of the lower member or arm 16, the under surface 17 whereof is inclined in a downward direction.

Before the connecting-plate is used in connection with a tooth the members or arms 15 are bent upon themselves to such an extent that they are L-shaped in plan view, and the outer member 19 of the uppermost bent arm extends, for example, toward the right-hand edge of the connecting-plate, while the corresponding member 19ª of the next arm extends toward the left-hand edge of the connecting-plate. Thus the bent members or sections of the arms 15 alternately extend in opposite directions; but the lower member or arm 16 is not bent, retaining its natural position, and the outer side edge of this member is beveled or is shaped to conform to the bottom wall of the chamber of the tooth into which it is to be introduced, as shown in Fig. 2.

The tooth at the first burning is provided with the chamber 10 and connecting-slot 11. The connecting-plate is then attached to the tooth after the arms 15 have been bent in the manner above stated, the bent portions of the arms engaging with the rear wall of the chamber 10, as shown in Fig. 4, while the body portion 12 of the plate extends beyond the rear face of the tooth and is adapted to enter a dovetail slot $b$, made in the backing B, as is shown in Fig. 1. When the connecting-plate is thus attached to a tooth, the lower member 16 of the said plate, located within the chamber 10 of the tooth, conforms to the bottom portion of the said chamber, the bottom of the chamber being so formed that its rear wall is upwardly inclined, as shown in Fig. 2. When the lower member or arm of the connecting-plate D is so fitted to the bottom portion of the chamber of the tooth, the tooth is not liable to move upon the connecting-plate, especially when a filling 20 is employed for the chamber 10, the said filling occupying all the space within the chamber 10 between the arms of the connecting-plate and the wall of the chamber. This filling 20 preferably consists of a clay that is fusible at a lower temperature than the clay of which the body of the tooth is constructed, so that after the connecting-plate is placed in position in the tooth and the chamber 10 of said tooth is provided with the filling 20 the tooth may be given a second burning, which will bake the filling 20, causing it to become virtually an integral portion of the tooth and the connecting-plate carried by said tooth.

In Figs. 7 and 8 I have illustrated modified forms of the inlays. The inlay D' (illustrated in Fig. 7) comprises a body member 21, having beveled side edges, and a longitudinal member 22, adapted to enter the porcelain. The longitudinal member 22, however, is T-shaped in cross-section, comprising a shank $d$ and a head $d'$ at right angles to the shank.

In the construction of the inlay D² (shown in Fig. 8) the body member 21ª is shaped in the same manner as the body member 21; but the longitudinal member or member that is adapted to enter the porcelain is substantially Y-shaped in cross-section, comprising a shank $d^2$ and a head $d^3$, made in longitudinal diverging sections.

Having thus described my invention, I claim as new and desire to secure by Letters Patent—

1. An inlay for artificial teeth, comprising a dovetail body provided with a plurality of arms projecting at right angles therefrom and having their ends bent, alternately in opposite directions, substantially as described.

2. An inlay for artificial teeth, consisting of a dovetail body provided with a plurality of arms, alternate arms, with the exception of the lowermost one, having their ends projecting laterally in opposite directions, the lowermost arm having its under surface beveled, substantially as described.

3. An artificial tooth provided with a chamber, and a slot in its under face communicating with the chamber, and an inlay or fastening-plate for the tooth, consisting of a body arranged to extend beyond the inner face of the tooth, and a plurality of anchoring-arms projecting from the body and extending within the chamber of the tooth, said arms having angular ends, substantially as described.

4. An artificial tooth, provided with a chamber, and a slot in its inner face communicating with the chamber, and an inlay or fastening-plate consisting of a body, dovetail in cross-section, and a member at an angle to the body, arranged to enter the slot in the tooth, the said member being divided into a series of arms, alternate arms having their free ends bent in opposite directions, for the purpose described.

5. An artificial tooth provided with a chamber and a slot in its inner face communicating with the chamber, and an inlay or fastening-plate consisting of a body, dovetail in cross-section, and a member at an angle to the body, arranged to enter the slot in the tooth, said member being divided into a series of arms, alternate arms, with the exception of the lower arm, having their free ends bent laterally in opposite directions, the lower arm having its lower edge fitted to the bottom contour of the chamber of the tooth, as set forth.

THOMAS STEELE.

Witnesses:
J. FRED. ACKER,
EVERARD BOLTON MARSHALL.